US007938750B2

(12) United States Patent
Langer et al.

(10) Patent No.: US 7,938,750 B2
(45) Date of Patent: May 10, 2011

(54) METHOD AND DEVICE FOR OPERATING A DRIVE UNIT

(75) Inventors: Winfried Langer, Illingen (DE); Georg Mallebrein, Korntal-Muenchingen (DE); Matthew Dorfman, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/974,501

(22) Filed: Oct. 27, 2004

(65) Prior Publication Data

US 2005/0115759 A1 Jun. 2, 2005

(30) Foreign Application Priority Data

Nov. 22, 2003 (DE) .................. 103 54 654

(51) Int. Cl.
*B60W 10/04* (2006.01)
*B60W 10/10* (2006.01)
*B60W 10/02* (2006.01)
(52) U.S. Cl. ....................... 477/115; 477/175
(58) Field of Classification Search .................. 477/174, 477/175, 181, 906; 701/67, 68
See application file for complete search history.

(56) References Cited

U.S. PATENT DOCUMENTS

| 5,440,921 A * | 8/1995 | Matsuno et al. ............. 73/117.3 |
| 6,463,375 B2 * | 10/2002 | Matsubara et al. ............. 701/54 |
| 6,466,852 B2 * | 10/2002 | Frohlich et al. ................. 701/62 |
| 6,547,699 B2 * | 4/2003 | Eich et al. ..................... 477/175 |
| 6,752,743 B2 * | 6/2004 | Eich et al. ..................... 477/175 |
| 6,849,027 B2 * | 2/2005 | Eich et al. ....................... 477/34 |
| 2003/0153430 A1 | 8/2003 | Huelser et al. |

FOREIGN PATENT DOCUMENTS

| DE | 10238464 | 10/2003 |
| EP | 922604 | 6/1999 |
| EP | 1217242 | 6/2002 |
| FR | 2771470 | 5/1999 |
| FR | 2827654 | 1/2003 |
| JP | 58-39821 | 3/1983 |
| JP | 3-41223 | 2/1991 |
| JP | 05322032 A * | 12/1993 |
| JP | 2002-188658 | 7/2002 |
| JP | 2002-266895 | 9/2002 |
| JP | 2002327840 A * | 11/2002 |
| JP | 2003-269214 | 9/2003 |

* cited by examiner

*Primary Examiner* — Tisha D Lewis
(74) *Attorney, Agent, or Firm* — Kenyon & Kenyon LLP

(57) ABSTRACT

In a method and a device for operating a drive unit, e.g., of a vehicle, to provide improved diagnosis of a state of a power transmission unit, the power transmission unit in the engaged state transmits an output power of an engine to a drive train, the state of the power transmission unit being detected. The state of the power transmission unit is diagnosed as a function of an output quantity of the engine.

10 Claims, 3 Drawing Sheets

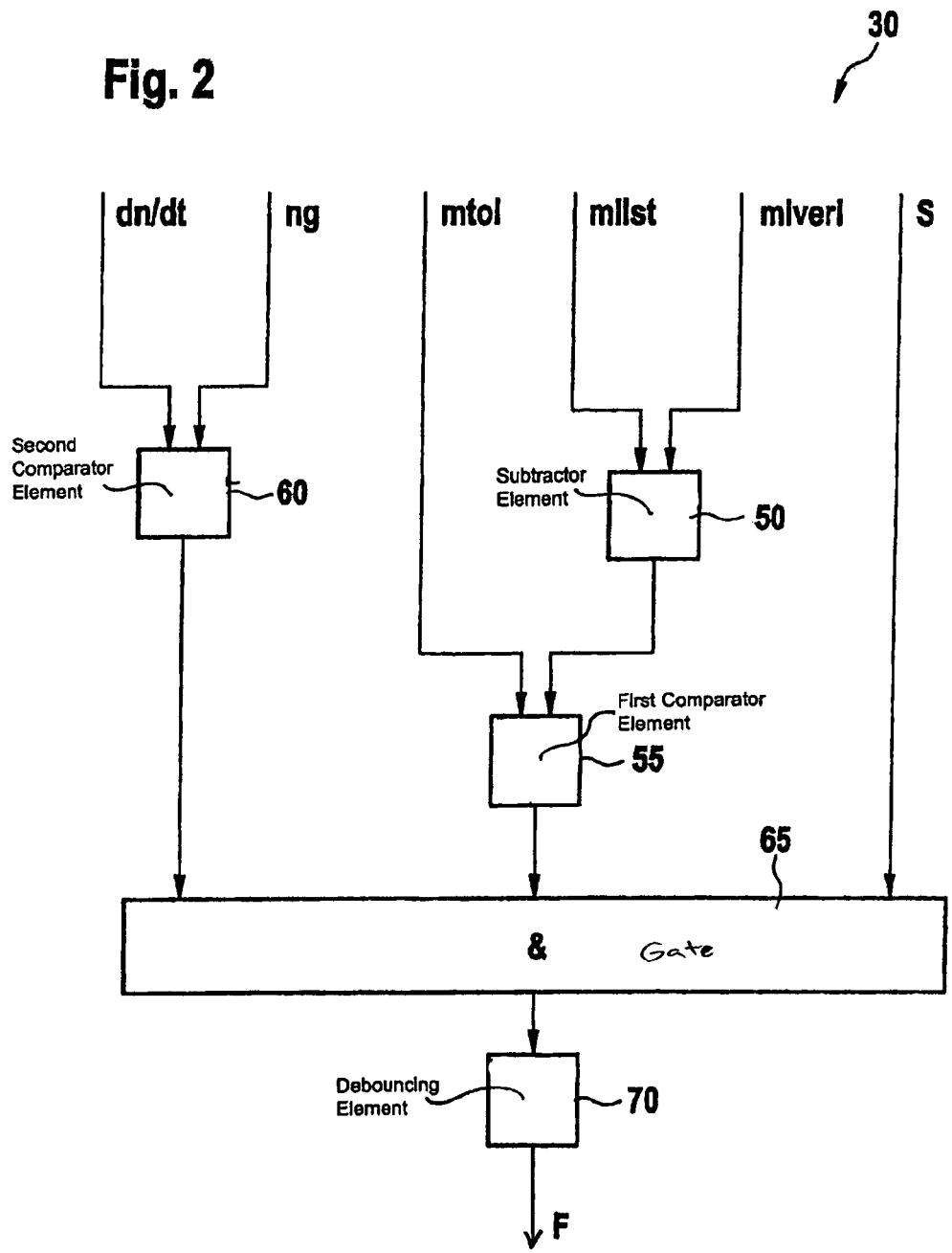

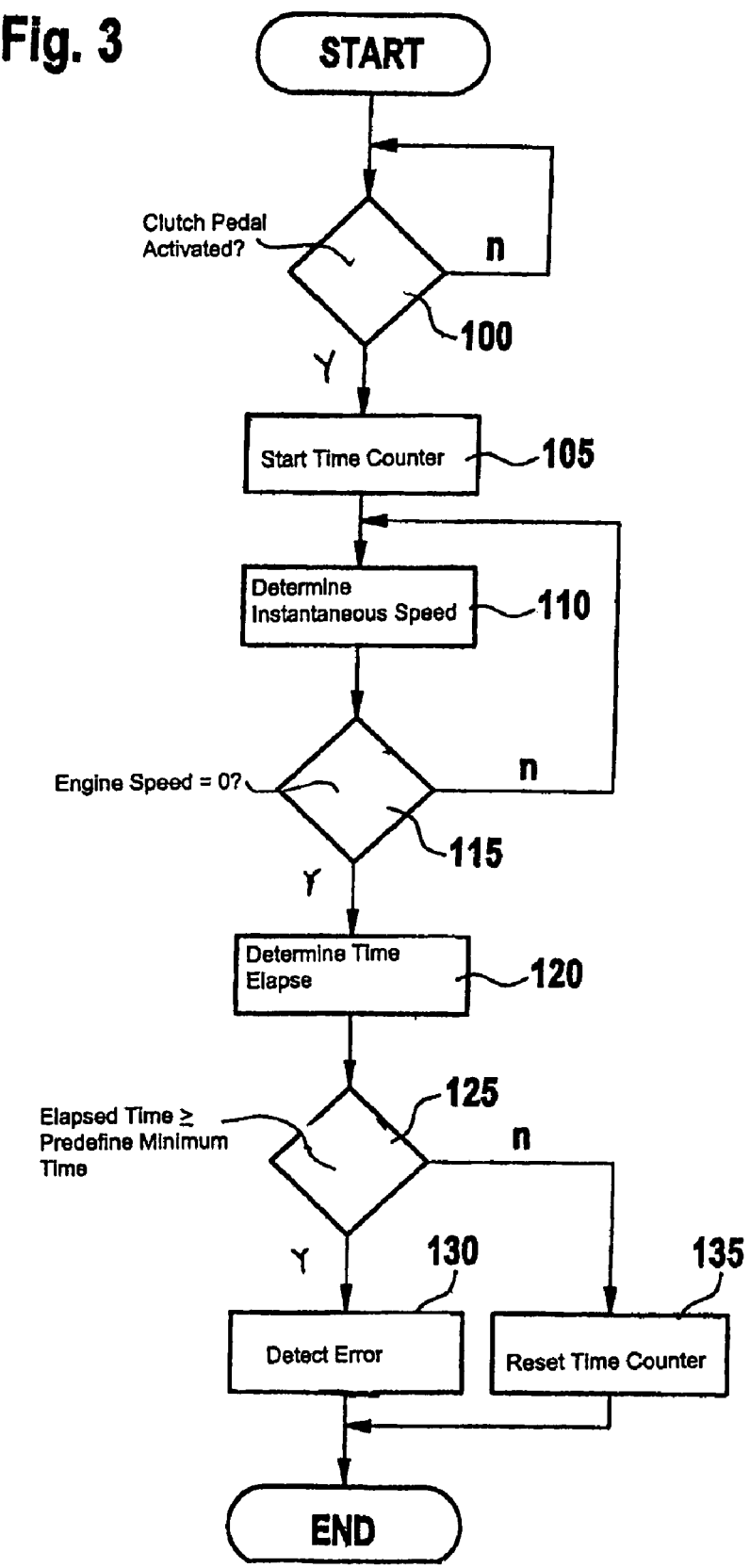

METHOD AND DEVICE FOR OPERATING A DRIVE UNIT

CROSS-REFERENCE TO RELATED APPLICATIONS

The present application claims priority to Application No. 103 54 654.5, filed in the Federal Republic of Germany on Nov. 22, 2003, which is expressly incorporated herein in its entirety by reference thereto.

FIELD OF THE INVENTION

The present invention relates to a method and a device for operating a drive unit.

BACKGROUND INFORMATION

Certain methods and devices for operating a drive unit, in particular of a vehicle, are conventional. The drive unit includes a power transmission unit, for example, in the form of a clutch, which in the engaged state transmits an output power of an engine to a drive train, the state of the power transmission unit being detected.

In vehicles having automatic start or repeat start in a start-stop operation, the starter must not be actuated while the drive train is engaged, but only while the drive train is disengaged, i.e., while the power transmission unit is disengaged. A neutral signal is required to control the starter, the signal being set when the power transmission unit is disengaged and thus when the starter may be enabled. This neutral signal must be validated via diagnosis. Usually an additional switch is used for validation.

SUMMARY

A method according to an example embodiment of the present invention and a device according to an example embodiment of the present invention for operating a drive unit, having features described herein, may provide that the state of the power transmission unit is diagnosed as a function of an output quantity of the engine. In this manner, simplified diagnosis of the detected state of the power transmission unit may be possible, which may also require less complexity, e.g., no additional switch.

An engaged state of the power transmission unit may be detected when an actual value of the output quantity of the engine is greater, for at least a predefined time period, than a maximum value of the output quantity characterizing the engine losses. This may make it possible to diagnose the detected state of the power transmission unit in a particularly simple manner using known or easy to determine quantities, for example, the output torque of the engine, the output power of the engine, etc.

The predefined time period may be selected to last at least long enough for the engine speed to be reliably limited given any actual value of the output quantity of the engine is greater than a maximum value of the output quantity characterizing the engine losses. In this manner, it may be ensured that an error is not erroneously detected due to the fact that the actual value of the output quantity of the engine exceeding the maximum value characterizing the engine losses may result in an increase in rotational speed when the clutch, i.e., the power transmission unit, is disengaged.

An engaged state of the power transmission unit may be detected when an actual value of the output quantity of the engine is greater than a maximum value of the output quantity characterizing the engine losses, and a gradient of the engine speed is less than a predefined threshold value. This may make it possible to detect the engaged state of the power transmission unit more rapidly, i.e., it may not be necessary to wait for a speed limitation to occur.

The engaged state of the power transmission unit may be detected when an actual value of the output quantity of the engine is greater, by at least a tolerance value, than a maximum value of the output quantity characterizing the engine losses. In this manner, tolerances in determining the actual value of the output quantity of the engine and in determining the maximum value of the output quantity characterizing the engine losses may be taken into account.

The predefined threshold value of the engine speed gradient may be selected as a function of the tolerance value. This may permit the reliability of the diagnosis to be enhanced.

The predefined threshold value of the engine speed gradient may be selected to be equal to the speed gradient obtained when the actual value of the output quantity exceeds the maximum value of the output quantity characterizing the engine losses by one-half of the tolerance value while the power transmission unit is disengaged. This may ensure that an actual value of the output quantity exceeding the value characterizing the engine losses prior to reaching the speed limitation may not be erroneously interpreted for determining an engaged state of the power transmission unit.

The diagnosis of the state of the power transmission unit may be suspended when misfiring of the engine is detected. In this manner, misdiagnosis in the event of misfiring may be prevented.

The possibility of performing an automatic start of the drive unit may be monitored together with the diagnosis of the state of the power transmission unit. This may permit monitoring of the automatic start in a simple and inexpensive manner.

An undesired engaged state of the power transmission unit may be detected when a clutch pedal is operated for a minimum time period and the engine still stalls without the stalling of the engine being able to be attributed to an instantaneous operating point and/or poor operating conditions of the engine. This may permit a mechanical defect in the power transmission unit or a rupture or crack in a connection between the clutch pedal and the power transmission unit to be detected.

The minimum time period may be selected so that for any possible operating state of the drive unit and defect-free power transmission unit, actuation of the clutch pedal may reliably suffice for preventing the engine from stalling as long as the engine does not stall because of its instantaneous operating point and/or poor operating conditions. This may ensure that erroneous detection regarding the function of the power transmission unit or the state of the connection between the clutch pedal and the power transmission unit may be avoided.

According to an example embodiment of the present invention, a method for operating a drive unit that includes a power transmission unit, the power transmission unit configured to transmit an output power of an engine to a drive train in an engaged state of the power transmission unit, includes: detecting a state of the power transmission unit; and diagnosing the state of the power transmission unit as a function of an output quantity of the engine.

The drive unit may be configured as a drive unit of a vehicle.

An engaged state of the power transmission unit may be detected in the detecting step when an actual value of the output quantity of the engine is greater, for at least a predefined time period, than a maximum value of an output quantity that characterizes losses of the engine.

The predefined time period may last at least long enough to reliably limit an engine speed given an actual value of the output quantity of the engine being greater than the maximum value of the output quantity that characterizes losses of the engine.

An engaged state of the power transmission unit may be detected in the detecting step when an actual value of the output quantity of the engine is greater than a maximum value of an output quantity that characterizes losses of the engine and a gradient of an engine speed is less than a predefined threshold value.

The engaged state of the power transmission unit may be detected in the detecting step when the actual value of the output quantity of the engine is greater, by at least one tolerance value, than the maximum value of the output quantity characterizing the losses of the engine.

The engaged state of the power transmission unit may be detected in the detecting step when the actual value of the output quantity of the engine is greater, by at least one tolerance value, than the maximum value of the output quantity characterizing the losses of the engine, and the predefined threshold value of the engine speed gradient may be a function of the tolerance value.

The predefine threshold value of the engine speed gradient may be equal to the engine speed gradient when the actual value of the output quantity exceeds the maximum value of the output quantity that characterizes the losses of the engine by one half of the tolerance value when the power transmission unit is disengaged.

The method may include suspending the diagnosing step when a misfiring of the engine is detected.

The method may include monitoring a possibility of performing an automatic start of the drive unit with the diagnosing step.

The detecting step may include detecting an unintended engaged state of the power transmission unit when a clutch pedal is actuated for a minimum time period and a stalling of the engine is not attributable to at least one of (a) an instantaneous operating point and (b) poor operating conditions of the engine.

The minimum time period may correspond to a time period in which for any possible operating state of the drive unit and defect-free power transmission unit, actuation of the clutch pedal is sufficient to prevent the engine from stalling as long as the engine is not stallable because of at least one of (a) the instantaneous operating point and (b) poor operating conditions.

According to an example embodiment of the present invention, a device for operating a drive unit that includes a power transmission unit, the power transmission unit configured to transmit an output power of an engine to a drive train in an engaged state of the power transmission unit, includes: a detection device configured to detect a state of the power transmission unit; and a diagnostic device configured to diagnose the state of the power transmission unit as a function of an output quantity of the engine.

According to an example embodiment of the present invention, a device for operating a drive unit that includes a power transmission unit, the power transmission unit configured to transmit an output power of an engine to a drive train in an engaged state of the power transmission unit, includes: means for detecting a state of the power transmission unit; and means for diagnosing the state of the power transmission unit as a function of an output quantity of the engine.

Exemplary embodiments of the present invention are illustrated in the appended Figures and explained in the following description.

BRIEF DESCRIPTION OF THE DRAWINGS

FIG. 2 is a function diagram to illustrate a method and a device according to exemplary embodiments of the present invention.

FIG. 3 illustrates a flow chart of a sequence of a method according to an exemplary embodiment of the present invention.

DETAILED DESCRIPTION

Figure 1:
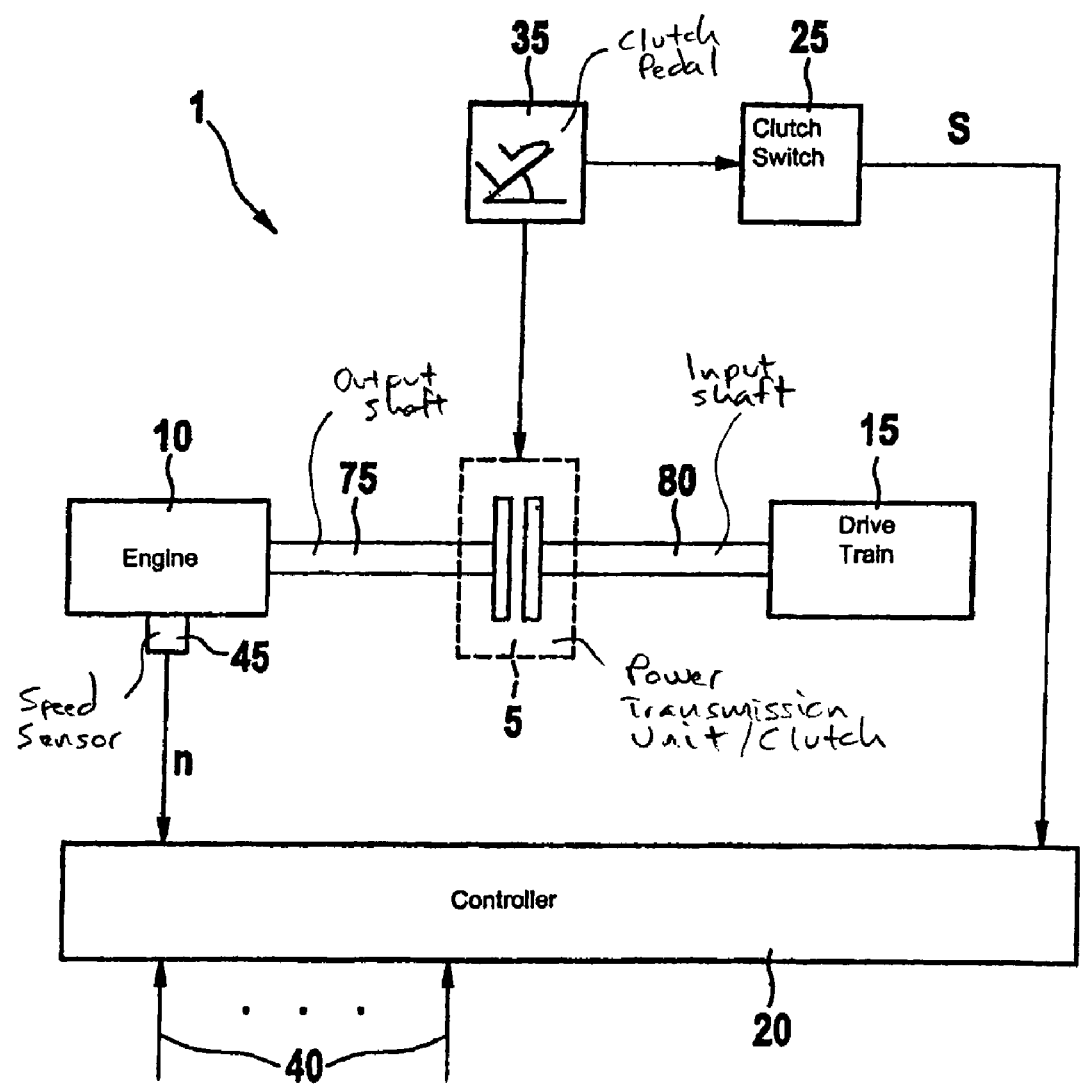
FIG. 1 is a block diagram of a drive unit.

In FIG. 1, reference symbol 1 denotes a drive unit of a motor vehicle, for example. Drive unit 1 includes an engine 10, which may be arranged as a gasoline engine, a diesel engine, etc. Engine 10 drives an input shaft 80 of a drive train 15 via an output shaft 75 and a power transmission unit 5. Power transmission unit 5 may be arranged as a clutch, for example. Drive train 15 includes, for example, a transmission and, in the case of a vehicle, the drive axles and the driven wheels. An output quantity of engine 10 is transmitted to drive train 15 when clutch 5 is engaged, while no power is transmitted from engine 10 to drive train 15 when clutch 5 is disengaged. The output quantity of engine 10 may be, for example, a torque or an output power or a cylinder charge in the case of an internal combustion engine or another quantity derived from one or more of the above quantities, etc. The following assumes, as an example, that the output quantity of engine 10 is a torque. Clutch 5 may be engaged or disengaged via a clutch pedal 35 as illustrated in FIG. 1. Alternatively, in the case of an automatic transmission, clutch 5 may also be engaged or disengaged automatically. The state of clutch 5 may be detected in a conventional manner, e.g., via a clutch switch. In the case of a manual transmission, in which clutch 5 is engaged or disengaged via clutch pedal 35, the clutch switch detects that clutch pedal 35 has been actuated and issues an appropriate signal S which indicates whether clutch 5 is engaged or disengaged. When clutch pedal 35 is fully depressed, the clutch switch, designated by reference symbol 25 in FIG. 1, is closed and signal S is set, for example, to indicate a disengaged state of clutch 5. When clutch pedal 35 is released, clutch switch 25 is open, and signal S is reset, for example, to indicate an engaged state of clutch 5. Signal S of clutch switch 25 is supplied to a controller 20 of drive unit 1. A speed sensor 45, which detects the speed of output shaft 75 and supplies it to controller 20 as engine speed n, is furthermore arranged on engine 10. Input quantities 40 characterizing the operating state of drive unit 1, e.g., of engine 10, are also supplied to controller 20. In the case of an engine 10 arranged as an internal combustion engine, output quantities 40 may be, for example, the supplied air mass flow, the accelerator pedal position in the case of a vehicle, the engine temperature, the intake manifold pressure, the oxygen content of the exhaust gas, the power request or torque request from secondary units such as the air conditioning unit, car radio, etc., as well as from vehicle functions such as transmission control, antilock system, traction control, idling control, antibucking control, etc.

The state of clutch 5 is diagnosed as a function of the torque of engine 10. The diagnosis is performed by a diagnostic unit 30, which may be integrated into engine controller 20 as hardware and/or software. An engaged state of clutch 5 is detected by diagnostic unit 30 when an actual value of the torque, also referred to hereinafter as the actual torque, is greater, for at least a predefined time period, than a maximum value of the torque characterizing the losses of engine 10, also referred to hereinafter as the loss torque. The maximum value of the loss torque characterizing the losses of engine 10 occurs at maximum engine speed and represents a maximum loss torque. When clutch 5 is disengaged after a speed limitation has occurred, the actual torque may no longer exceed the maximum loss torque. The loss torque is the torque which must be applied in the no-load state of engine 10, i.e., for example, during idling when the accelerator pedal is released, due to the torque needed by the above-mentioned secondary units and vehicle functions and due to the friction torque of engine 10. The actual torque and the loss torque may be determined from input quantities 40 and engine speed n supplied to controller 20 in a conventional manner. The predefined time period may be selected such that, for any actual torque that is greater than the maximum loss torque, the speed limitation may be reliably achieved within this predefined time after the accelerator pedal has been actuated while clutch 5 is disengaged. After the speed limitation has occurred, the actual torque may no longer exceed the maximum loss torque when clutch 5 is disengaged. The predefined time period may be determined on a test bench, for example. The engaged state of clutch 5 may be detected by diagnostic unit 30 more rapidly without waiting for the predefined time period to elapse if the actual torque is greater than the maximum loss torque and a time gradient $dn/dt$ of engine speed n is less than a predefined threshold value. If the actual torque is greater than the maximum loss torque in the disengaged state of clutch 5 and the speed limitation has not yet been achieved, this results in a more rapid increase in the engine speed and thus in a greater gradient $dn/dt$ than in the engaged state of clutch 5 and with the actual torque exceeding the maximum loss torque by the same amount. In the latter case, drive train 15 may still be driven, which may prevent a more rapid increase in speed. Gradient $dn/dt$ may be determined in a simple manner via derivation over time, from the received signal of speed sensor 45 in controller 20. The predefined threshold value of the speed gradient may be selected such that the above-described speed increase when the clutch is disengaged is unambiguously distinguishable from the speed increase when the clutch is engaged. Optionally, in order to detect the engaged state of clutch 5 in diagnostic unit 30, the actual torque may not simply exceed the maximum loss torque but may exceed the maximum loss torque by at least one tolerance value. In this manner, tolerances in determining the actual torque and the maximum loss torque are taken into account by appropriately selecting the tolerance value, for example, on a test bench. This may increase diagnosis reliability. The tolerance value should not be selected to be so large that it unnecessarily limits the diagnostic range. An excessively small tolerance value may result in the risk of erroneous diagnosis. The predefined threshold value of speed gradient $dn/dt$ may optionally be selected as a function of the tolerance value. This may make it possible to achieve the above-described distinguishability of the speed increase when clutch 5 is engaged and when clutch 5 is disengaged in a definite and particularly simple manner. The predefined threshold value of speed gradient $dn/dt$ may be selected, for example, such that it is equal to the speed gradient resulting when the actual torque exceeds the maximum loss torque by one-half of the tolerance value in the disengaged state of clutch 5. The desired distinguishability is achievable for such a predefined threshold value. This may also apply to other difference values between the actual torque and the maximum loss torque, for example, also for a difference value equal to 1.5 times the tolerance value.

If, when engine 10 is arranged as an internal combustion engine, the actual torque is reduced by misfiring and this misfiring is detected by controller 20 in a conventional manner, for example, by evaluating the uneven running of engine 10, it is recommended that the diagnosis of the state of clutch 5 by diagnostic unit 30 be suspended for as long as this misfiring of engine 10 is occurring. Otherwise, the diagnosis of the state of clutch 5 may be erroneous due to the actual torque distorted by the misfiring.

The diagnosis of the state of clutch 5 may also make it possible to verify the possibility of performing an automatic start of drive unit 1. The prerequisite for such an automatic start is that clutch 5 be disengaged. If the state of clutch 5 is diagnosed in the manner described above, and it is determined, as described above, that clutch 5 is engaged, an automatic start is blocked. Stopping may also be disabled in vehicles having start-stop operation. It is then not possible to automatically stop engine 10, at a traffic light, for example. If the above-described conditions for the state of engaged clutch 5 have not been detected by diagnostic unit 30, clutch 5 is in the disengaged state and automatic start is enabled.

The operation of the device and of the method using diagnostic unit 30 as an example is illustrated below with reference to the function diagram of FIG. 2. The detection of the state of clutch 5 is to be monitored by diagnostic unit 30 via clutch switch 25. As illustrated in FIG. 2, diagnostic unit 30 receives the following signal quantities: Speed gradient $dn/dt$, predefined threshold value ng for the speed gradient, tolerance value mtol, actual torque miist, maximum loss torque miverl, and signal S of clutch switch 25.

Actual torque miist and maximum loss torque miverl are supplied to a subtractor element 50, where maximum loss torque miverl is subtracted from actual torque miist. Thus difference D=misst−miverl is supplied from the output of subtractor element 50 to a first comparator element 55, which also receives tolerance value mtol. If difference D is greater than tolerance value mtol, the output of first comparator element 55 is set, otherwise it is reset. In a second comparator element 60, speed gradient $dn/dt$ is compared to predefined threshold value ng, and the output of second comparator element 60 is set if speed gradient $dn/dt$ is less than predefined threshold value ng; otherwise the output of second comparator element 60 is reset. Signal S of clutch switch 25 is set if clutch switch 25 detects the state of the engaged clutch; otherwise it is reset. Signal S, the output of first comparator element 55, and the output of second comparator element 60 are supplied to an AND gate 65, the output of which is set if all its inputs are set; otherwise its output is reset. The output of AND gate 65 may be optionally supplied to a debouncing element 70 to debounce the output signal of AND gate 65, as illustrated in FIG. 2, so that a valid error monitoring signal F does not appear at the output of debouncing element 70 until a debouncing time suitably predefined for debouncing element 70 has elapsed. The debouncing time may be suitably selected, for example, based on empirical values determined on a test bench, for example, to take into account time shifts of the input signals of AND gate 65 and thus to generate a relevant error monitoring signal F. If error monitoring signal F is set, the detection of the state of clutch 5 by clutch switch 25 is erroneous; otherwise it is error-free. Automatic start is blocked if error monitoring signal F is set; otherwise automatic start is enabled.

If the debouncing time is selected to be at least as long as the predefined time, speed gradient $dn/dt$ and predefined threshold value ng do not need to be supplied to diagnostic unit 30, because in that case the predefined time until speed limitation is reliably achieved by the debouncing time. In this case, a valid error monitoring signal F does not appear until the debouncing time has elapsed. After this debouncing time, actual torque miist will also exceed maximum loss torque miverl by no more than the tolerance value when clutch 5 is disengaged, so that monitoring of speed gradient dn/dt is no longer necessary.

FIG. 3 illustrates a flow chart to illustrate a sequence of a method according to an example embodiment of the present invention. This example embodiment is based on the following: If engine 10 stalls although clutch pedal 35 has been actuated for a minimum time until engine 10 stalls and engine 10 should not stall for other reasons during this minimum time, the conclusion is drawn that engine 10 has stalled because of an unintended adhesion of clutch 5. This may be caused by a mechanical defect in clutch 5 or by a rupture or crack in the clutch actuator part, i.e., the connection between clutch pedal 35 and clutch 5. As stated before, other reasons for stalling of engine 10 within the minimum time should be ruled out. Such other reasons may exist as a function of the operating point, for example, when the oxygen level in the exhaust gas is outside a permissible range, as may be the case, for example, in the event of transition compensation, if poor operating conditions such as ignition problems exist, for example, in the form of misfiring, or if an exhaust gas recirculation valve of engine 10 jams.

The minimum time period may be suitably determined on a test bench, for example. The minimum time period may be selected so that for any possible operating state of drive unit 1 and defect-free clutch 5, the actuation of clutch pedal 35 is sufficient for preventing engine 10 from stalling as long as engine 10 does not stall because of its instantaneous operating point. The minimum time is thus determined under operating conditions of drive unit 1, i.e., of engine 10, where all secondary units of the vehicle, such as an air conditioning unit, electrical sunroof, etc., are on and engine 10 is operated with the highest possible losses and low efficiency.

One error response to a defective clutch 5 or a defective connection between clutch pedal 35 and clutch 5 may be that a driver's intent to restart engine 10 is no longer detected by the analysis of the signal of clutch switch 25, but only via actuation of the ignition key. In addition or as an alternative to actuating the ignition key, a driver's intent to restart engine 10 may also be detected by analyzing the actuation of a brake pedal or an accelerator pedal. Actuation of the accelerator pedal when engine 10 is shut off may be interpreted as a starting intent. Similarly, actuation of the brake pedal when engine 10 is shut off may be interpreted to the effect that engine 10 is to be started, while unintended driving-off of the vehicle is to be prevented. To increase the reliability of detection of the driver's intent to restart engine 10, it may be provided that the detection of brake or accelerator pedal actuation be validated by a redundant signal, e.g., in a conventional manner.

In the following, the flow chart of FIG. 3 is explained. After the start of the program, controller 20 checks at a program point 100 whether clutch pedal 35 has been actuated to disengage clutch 5, i.e., according to the arrangement described with reference to FIG. 1, whether signal S of clutch switch 25 is set. If this is the case, the program branches to program point 105, otherwise it branches back to program point 100.

At program point 105, controller 20 starts a time counter, which detects the time of uninterrupted actuation of clutch pedal 35. The program subsequently branches to program point 110.

At program point 110, controller 20 determines the instantaneous engine speed based on the signal of speed sensor 45. The program subsequently branches to a program point 115.

At program point 115, controller 20 checks whether the engine speed is equal to zero, i.e., if engine 10 has stalled. If this is the case, the program branches to program point 120, otherwise it branches back to program point 110.

At program point 120, controller 20 determines the time elapsed since the start of the time counter. The program subsequently branches to program point 125.

At program point 125, controller 20 checks whether the elapsed time of the time counter is greater than or equal to the predefined minimum time. If this is the case, the program branches to program point 130, otherwise it branches to program point 135.

At program point 130, controller 20 detects an error in clutch 5 or in the connection between clutch 5 and clutch pedal 35. This error may be signaled to the driver of the vehicle via a display device. Furthermore, one of the above-described error responses may be initiated. The program is then terminated.

At program point 135, controller 20 resets the time counter. The program is then terminated.

If, while the program is running and, e.g., after the start of the time counter, controller 20 detects that engine 10 is to be shut down due to the operating point, for example, due to one of the above-mentioned reasons such as misfiring, etc., the time counter, if started, is immediately reset and the program is terminated.

What is claimed is:

1. A method for operating a drive unit that includes a power transmission unit, the power transmission unit configured to transmit an output power of an engine to a drive train in an engaged state of the power transmission unit, comprising:
   detecting an engaged or disengaged state of the power transmission unit; and
   diagnosing the engaged or disengaged state of the power transmission unit as a function of an output quantity of the engine,
   wherein an engaged state of the power transmission unit is detected in the detecting step when an actual value of the output quantity of the engine is greater, for at least a predefined time period, than a maximum value of an output quantity that characterizes losses of the engine.

2. The method according to claim 1, wherein the drive unit is configured as a drive unit of a vehicle.

3. The method according to claim 1, wherein the engaged state of the power transmission unit is detected in the detecting step when the actual value of the output quantity of the engine is greater, by at least one tolerance value, than the maximum value of the output quantity characterizing the losses of the engine.

4. The method according to claim 1, further comprising monitoring a possibility of performing an automatic start of the drive unit with the diagnosing step.

5. A method for operating a drive unit that includes a power transmission unit, the power transmission unit configured to transmit an output power of an engine to a drive train in an engaged state of the power transmission unit, comprising:
   detecting a state of the power transmission unit; and
   diagnosing the state of the power transmission unit as a function of an output quantity of the engine,
   wherein an engaged state of the power transmission unit is detected in the detecting step when an actual value of the output quantity of the engine is greater, for at least a predefined time period, than a maximum value of an output quantity that characterizes losses of the engine,
   wherein the predefined time period lasts at least long enough to reliably limit an engine speed given an actual value of the output quantity of the engine being greater than the maximum value of the output quantity that characterizes losses of the engine.

6. A method for operating a drive unit that includes a power transmission unit, the power transmission unit configured to transmit an output power of an engine to a drive train in an engaged state of the power transmission unit, comprising:
  detecting a state of the power transmission unit; and
  diagnosing the state of the power transmission unit as a function of an output quantity of the engine,
  wherein an engaged state of the power transmission unit is detected in the detecting step when an actual value of the output quantity of the engine is greater than a maximum value of an output quantity that characterizes losses of the engine and a gradient of an engine speed is less than a predefined threshold value.

7. A method for operating a drive unit that includes a power transmission unit, the power transmission unit configured to transmit an output power of an engine to a drive train in an engaged state of the power transmission unit, comprising:
  detecting a state of the power transmission unit; and
  diagnosing the state of the power transmission unit as a function of an output quantity of the engine,
  wherein an engaged state of the power transmission unit is detected in the detecting step when an actual value of the output quantity of the engine is greater than a maximum value of an output quantity that characterizes losses of the engine and a gradient of an engine speed is less than a predefined threshold value,
  wherein the engaged state of the power transmission unit is detected in the detecting step when the actual value of the output quantity of the engine is greater, by at least one tolerance value, than the maximum value of the output quantity characterizing the losses of the engine, the predefined threshold value of the engine speed gradient being a function of the tolerance value.

8. A method for operating a drive unit that includes a power transmission unit, the power transmission unit configured to transmit an output power of an engine to a drive train in an engaged state of the power transmission unit, comprising:
  detecting a state of the power transmission unit; and
  diagnosing the state of the power transmission unit as a function of an output quantity of the engine,
  wherein an engaged state of the power transmission unit is detected in the detecting step when an actual value of the output quantity of the engine is greater than a maximum value of an output quantity that characterizes losses of the engine and a gradient of an engine speed is less than a predefined threshold value,
  wherein the engaged state of the power transmission unit is detected in the detecting step when the actual value of the output quantity of the engine is greater, by at least one tolerance value, than the maximum value of the output quantity characterizing the losses of the engine, the predefined threshold value of the engine speed gradient being a function of the tolerance value,
  wherein the predefined threshold value of the engine speed gradient is equal to the engine speed gradient when the actual value of the output quantity exceeds the maximum value of the output quantity that characterizes the losses of the engine by one half of the tolerance value when the power transmission unit is disengaged.

9. A method for operating a drive unit that includes a power transmission unit, the power transmission unit configured to transmit an output power of an engine to a drive train in an engaged state of the power transmission unit, comprising:
  detecting a state of the power transmission unit; and
  diagnosing the state of the power transmission unit as a function of an output quantity of the engine,
  wherein the detecting step includes detecting an unintended engaged state of the power transmission unit when a clutch pedal is actuated for a minimum time period and a stalling of the engine is not attributable to at least one of (a) an instantaneous operating point and (b) poor operating conditions of the engine.

10. A method for operating a drive unit that includes a power transmission unit, the power transmission unit configured to transmit an output power of an engine to a drive train in an engaged state of the power transmission unit, comprising:
  detecting a state of the power transmission unit; and
  diagnosing the state of the power transmission unit as a function of an output quantity of the engine,
  wherein the detecting step includes detecting an unintended engaged state of the power transmission unit when a clutch pedal is actuated for a minimum time period and a stalling of the engine is not attributable to at least one of (a) an instantaneous operating point and (b) poor operating conditions of the engine,
  wherein the minimum time period corresponds to a time period in which for any possible operating state of the drive unit and defect-free power transmission unit, actuation of the clutch pedal is sufficient to prevent the engine from stalling as long as the engine is not stallable because of at least one of (a) the instantaneous operating point and (b) poor operating conditions.

\* \* \* \* \*